United States Patent
Ohmura et al.

(10) Patent No.: US 11,606,964 B2
(45) Date of Patent: Mar. 21, 2023

(54) BREAD CRUMB-COATED FOOD ITEM AND METHODS OF MAKING

(71) Applicant: NISSHIN FOODS INC., Tokyo (JP)

(72) Inventors: Masato Ohmura, Tokyo (JP); Shuhei Yamazaki, Tokyo (JP); Michihiro Sakakibara, Tokyo (JP)

(73) Assignee: NISSHIN SEIFUN WELNA INC., Tokyo (JP)

( * ) Notice: Subject to any disclaimer, the term of this patent is extended or adjusted under 35 U.S.C. 154(b) by 305 days.

(21) Appl. No.: 16/479,445

(22) PCT Filed: Feb. 16, 2018

(86) PCT No.: PCT/JP2018/005395
§ 371 (c)(1),
(2) Date: Jul. 19, 2019

(87) PCT Pub. No.: WO2018/151244
PCT Pub. Date: Aug. 23, 2018

(65) Prior Publication Data
US 2019/0373927 A1    Dec. 12, 2019

(30) Foreign Application Priority Data
Feb. 17, 2017   (JP) .............. JP2017-028353

(51) Int. Cl.
*A23L 7/157* (2016.01)
*A23P 20/12* (2016.01)

(52) U.S. Cl.
CPC ............. *A23L 7/157* (2016.08); *A23P 20/12* (2016.08); *A23V 2002/00* (2013.01)

(58) Field of Classification Search
CPC ...................................................... A23L 7/157
See application file for complete search history.

(56) References Cited

U.S. PATENT DOCUMENTS

| | | | | |
|---|---|---|---|---|
| 4,068,009 A | * | 1/1978 | Rispoli ............. | A23L 7/157 426/291 |
| 4,496,601 A | * | 1/1985 | Rispoli ............. | A23L 13/57 426/289 |
| 4,675,197 A | * | 6/1987 | Banner ............. | A23P 20/12 426/243 |

FOREIGN PATENT DOCUMENTS

| | | | |
|---|---|---|---|
| CN | 102365981 A | 3/2012 | |
| CN | 104970270 A | 10/2015 | |
| EP | 0 155 760 A1 | 9/1985 | |
| EP | 0273475 | 7/1988 | |
| EP | 1186243 | 3/2002 | |
| GB | 2185874 A * | 8/1987 | .......... A23L 1/0032 |
| JP | 55-150870 | 11/1980 | |
| JP | 63-214171 | 9/1988 | |
| JP | 03-277245 | 12/1991 | |
| JP | 07-184598 | 7/1995 | |
| JP | 2000-000072 | 1/2000 | |
| JP | 5417281 | 2/2014 | |
| WO | 93/06752 A1 | 4/1993 | |
| WO | 01/08513 A1 | 2/2001 | |

OTHER PUBLICATIONS

USA Standard Mesh Chart, available online as of Aug. 20, 2021 from https://www.dualmfg.com. pp. 1-4. (Year: 2021).*
Extended European Search Report issued in European Patent Application No. 18753661.0 dated Nov. 10, 2020.
Database GNPD Mintel, "Breadcrumbs with Paprika," Sep. 29, 2014, retrieved from www.gmpd.com.
International Search Report, PCT/JP2018/005395, dated Mar. 27, 2018.
Nisshin Seifun Group Inc. , news release, [online], Feb. 7, 2017, [retrieved on Mar. 15, 2018], Internet <URL:https://www.nisshin.com/upioads/170207_dry.pdf>.

* cited by examiner

*Primary Examiner* — Jenna A Watts
(74) *Attorney, Agent, or Firm* — Nixon & Vanderhye (57) ABSTRACT

Breadcrumbs have a grain size distribution in which the proportion of a fraction of breadcrumbs that have a grain size 2.36 mm is 8-21 mass % and the proportion of a fraction of breadcrumbs that have a grain size ≤1.18 mm is ≤45 mass %, and have a bulk density of 270-600 ml/100 g. A breadcrumb powder shaker container includes: the breadcrumbs or breadcrumb mix; and a shaker container containing a breadcrumb powder to be shaken out including the breadcrumbs or the breadcrumb mix, the shaker container having a shake-out hole. The shake-out hole has a maximum diametric length of 10-55 mm. This enables simply applying the breadcrumbs or the breadcrumb mix directly to a food material, enabling a high-quality cooked breadcrumb-coated food item, while retaining the flavor of the food material to a high level irrespective of the amount of oil used in deep frying.

3 Claims, 2 Drawing Sheets

BREAD CRUMB-COATED FOOD ITEM AND METHODS OF MAKING

TECHNICAL FIELD

The present invention relates to breadcrumbs that are used as a coating material for a cooked breadcrumb-coated food item such as a Japanese-style pork cutlet, a breadcrumb mix that contains the breadcrumbs, and a breadcrumb powder shaker container that contains the breadcrumbs or the breadcrumb mix as a content material, and can be used to shake the content material out of the shaker container.

BACKGROUND ART

Cooked breadcrumb-coated food items in which meat, fish, and the like are used are usually made by first applying wheat flour (coating powder) to a raw food material such as meat (for example, pork, beef, or chicken) or fish (for example, horse mackerel, or salmon), then dipping the raw food material in an egg mixture or a liquid batter, applying breadcrumbs to the raw food material, and then cooking the raw food material through shallow frying, deep frying, or the like. However, such a set of operations is very troublesome, and there is an increasing demand for making a cooked breadcrumb-coated food item with an easy operation of simply applying breadcrumbs directly to a food material to cook the food material without having to apply a coating powder to the food material, and dip the food material in an egg mixture or the like.

As a technique that can meet the demand described above, breadcrumbs alone that can adhere to a food material, and a breadcrumb mix composed mainly of the breadcrumbs have been proposed. For example, Patent Literature 1 discloses a breadcrumb mix that contains breadcrumbs and at least one selected from a thickening material, a pregelatinized starch, a dried egg white powder, and a dried whole egg powder. However, the breadcrumb mix disclosed in Patent Literature 1 is made by simply mixing breadcrumbs with additional components, and is thus disadvantageous in that the components separate from each other during storage, and a sufficient amount of breadcrumb mix cannot be applied to a food material.

As an improved version of the breadcrumb mix that has the function of adhering to a food material as disclosed in Patent Literature 1, Patent Literature 2 discloses a breadcrumb mix that contains dried breadcrumbs, a pregelatinized starch and/or a protein powder, and a polysaccharide thickener. Patent Literature 3 discloses processed breadcrumbs obtained by applying a starch, a protein, a saccharide or the like to the surface of undried breadcrumbs. Patent Literatures 2 and 3 teach that there is no particular limitation on the size of the breadcrumbs, and any size can be selected. These documents also teach that the breadcrumbs preferably have an average grain size (a median of cumulative values obtained through Microtrac FSA measurement) of 100 μm to 7 mm, and more preferably 200 μm to 5 mm.

Patent Literature 4 discloses that breadcrumbs that have an average grain size of 1.2 to 1.8 mm and in which the proportion of a fraction of breadcrumbs that have an average grain size of less than 0.7 mm is less than 5 wt % and the proportion of a fraction of breadcrumbs that have an average grain size greater than 2.4 mm is less than 5 wt % are used in order to obtain a cooked breadcrumb-coated food item with a coating that has a good visual appearance and a crispy texture. Patent Literature 5 discloses a method for making a ham cutlet or a sausage cutlet with a coating that is unlikely to separate from the ham or the sausage when being deep fried and that has a good texture, the method including: applying a coating powder to a slice of ham or a sausage, dipping the slice of ham or the sausage in a liquid batter, and then coating the slice of ham or the sausage with breadcrumbs. As the breadcrumbs, breadcrumbs composed of 90 wt % or more of breadcrumbs that have passed through a 2 mesh sieve but remained on a 40 mesh sieve (corresponding to a grain size of about 0.37 to 8 mm) and 20 wt % or more of breadcrumbs that remained on a 8 mesh sieve (corresponding to a grain size of about 2.2 mm or more) are used.

CITATION LIST

Patent Literature

Patent Literature 1: JP S55-150870A
Patent Literature 2: Japanese Patent No. 5417281
Patent Literature 3: European Patent No. 1186243
Patent Literature 4: European Patent Application Publication No. 0273475
Patent Literature 5: JP H7-184598A

SUMMARY OF INVENTION

The breadcrumb mixes disclosed in Patent Literatures 2 and 3 are advantageous in that separation of the components of the breadcrumb mixes is unlikely to occur during storage even though the breadcrumb mixes have the function of adhering to a food material. However, there is still room for improvement to meet recent increasing demand for better quality cooked breadcrumb-coated food items. Technology has not yet been provided with which a high-quality cooked breadcrumb-coated food item can be produced with an easy operation, such the high-quality cooked breadcrumb-coated food item having a good visual appearance in which the coating (breadcrumbs) is uniformly applied to the entire food material, and the coating having a good texture with appropriate crispiness.

It is an object of the present invention to provide breadcrumbs with which a high-quality cooked breadcrumb-coated food item that has a good visual appearance and a good texture can be easily produced, a breadcrumb mix, and a breadcrumb powder shaker container.

The inventors of the present invention conducted intensive studies to solve the problem described above, and found that an appropriate amount of breadcrumbs or breadcrumb mix can be reliably applied to a food material by containing breadcrumbs that have a specific grain size distribution and a bulk density or a breadcrumb mix that contains the breadcrumbs in a shaker container that has a shake-out hole, and shaking out the breadcrumbs or the breadcrumb mix through the shake-out hole so as to apply the breadcrumbs or the breadcrumb mix to the food material.

The present invention has been made based on the finding described above, and relates to breadcrumbs having a grain size distribution in which the proportion of a fraction of breadcrumbs that have a grain size of 2.36 mm or more is 8 to 21 mass % and the proportion of a fraction of breadcrumbs that have a grain size of 1.18 mm or less is 45 mass % or less, and having a bulk density of 270 to 600 ml/100 g.

Also, the present invention relates to a breadcrumb mix containing the breadcrumbs according to the present invention described above and at least one selected from the group consisting of a protein material and a thickener.

Also, the present invention relates to a breadcrumb-coated food item in which the breadcrumbs or the breadcrumb mix according to the present invention described above is attached to the surface of a food material.

Also, the present invention relates to a breadcrumb powder shaker container including: the breadcrumbs or the breadcrumb mix according to the present invention described above; and a shaker container that contains a breadcrumb powder to be shaken out that includes the breadcrumbs or the breadcrumb mix, the shaker container including a shake-out hole through which the breadcrumb powder is shaken out, wherein the shake-out hole has a maximum diametric length of 10 to 55 mm.

DESCRIPTION OF EMBODIMENTS

The breadcrumbs according to the present invention are characterized in that the breadcrumbs have a grain size distribution and a bulk density within specific ranges described below. According to the findings of the inventors of the present invention, the grain size distribution and the bulk density of breadcrumbs significantly affect the adhesion of the breadcrumbs to the food material, and ultimately affect the visual appearance and the texture of a cooked breadcrumb-coated food item obtained using the breadcrumbs. Also, a high-quality cooked breadcrumb-coated food item that has a good visual appearance and a good texture can be easily produced only when both the grain size distribution and the bulk density are within specific ranges described below. As used herein, the expression "easily produce" specifically means, for example, requiring less time and effort to apply an appropriate amount of breadcrumbs to a food material to obtain a high-quality cooked breadcrumb-coated food item. That is, as the method for applying breadcrumbs to a food material, conventionally, an ordinary method has been used in which breadcrumbs are spread on a tray, and then a food material is placed on the breadcrumbs so as to apply the breadcrumbs to the entire surface of the food material by changing the position of the food material in the breadcrumbs appropriately. However, the breadcrumbs according to the present invention are applicable to, in addition to the ordinary method for applying breadcrumbs to a food material, a method for applying breadcrumbs to a food material by using a shaker container. With the method that uses a shaker container, an appropriate amount of breadcrumbs can be applied to a food material much more simply than the ordinary method for applying breadcrumbs to a food material and thus the workability of producing a cooked breadcrumb-coated food item can be improved significantly. The fact that the breadcrumbs according to the present invention are usable as the breadcrumb powder to be shaken out is closely related to the fact that the grain size distribution and the bulk density of the breadcrumbs are within specific ranges. How the breadcrumbs according to the present invention are shaken out will be described later in detail.

The breadcrumbs according to the present invention have a grain size distribution in which the proportion of a fraction of breadcrumbs that have a grain size of 2.36 mm or more is 8 to 21 mass %, and the proportion of a fraction of breadcrumbs that have a grain size of 1.18 mm or less is 45 mass % or less. In other words, the grain size distribution of the breadcrumbs according to the present invention is set such that the proportion of a fraction of breadcrumbs that do not pass through a 7.5 mesh JIS sieve (i.e., the fraction of breadcrumbs that remain on the mesh of the sieve) is 8 to 21 mass %, and the proportion of a fraction of breadcrumbs that pass through a 14 mesh JIS sieve (i.e., the fraction of breadcrumbs that do not remain on the mesh of the sieve) is 45 mass % or less. Regarding the breadcrumbs, if the proportion of a fraction of breadcrumbs that have a grain size of 2.36 mm or more is outside the range of 8 to 21 mass %, the adhesion of the breadcrumbs to the food material decreases, as a result of which the cooked breadcrumb-coated food item obtained using such breadcrumbs may have a poor visual appearance and a poor texture. On the other hand, regarding the breadcrumbs, if the proportion of a fraction of breadcrumbs that have a grain size of 1.18 mm or less exceeds 45 mass %, the cooked breadcrumb-coated food item obtained using such breadcrumbs may have a poor visual appearance. Particularly, in terms of visual appearance of the coating, the adhesion of the coating may not be uniform, and the breadcrumbs may not sufficiently stand upright, and thus a visual appearance preferable as a fried food item may not be obtained. A more preferable grain size distribution of the breadcrumbs is set such that the proportion of a fraction of breadcrumbs that have a grain size of 2.36 mm or more is 10 to 18 mass % and the proportion of a fraction of breadcrumbs that have a grain size of 1.18 mm or less is 22 to 43 mass %. The grain size distribution of the breadcrumbs is measured using the following method.

<Method for Measuring Grain Size Distribution>

In a commercially available vibrating sieve shaker (for example, AS Control available from Verder Scientific, Co., Ltd.), 7.5 mesh (with openings of 2.36 mm) sieve (with a mesh diameter of 200 mm) and 14 mesh (with openings of 1.18 mm) sieve (with a mesh diameter of 200 mm) are vertically set in two levels, 50 g of breadcrumbs used as a measurement target is placed on the mesh (7.5 mesh) of the sieve on the upper level, and sieved under the conditions of an amplitude of 2.0 mm, a vibration time of 2 minutes, and an interval time of 15 seconds (the operation of vibrating the vibrating sieve shaker for 15 seconds and stopping the vibration is repeated). The breadcrumbs remaining on the 7.5 mesh sieve after the vibration operations are defined as "a fraction of breadcrumbs that have a grain size of 2.36 mm or more", and the mass proportion of the fraction relative to the total mass of the breadcrumbs is calculated. At the same time, the breadcrumbs that have passed through the mesh (14 mesh) sieve on the lower level are defined as "a fraction of breadcrumbs that have a grain size of 1.18 mm or less", and the mass proportion of the fraction relative to the total mass of the breadcrumbs is calculated.

There is no particular limitation on the average grain size of the breadcrumbs according to the present invention as long as the grain size distribution satisfies the above-described specific ranges. However, the average grain size of the breadcrumbs according to the present invention is preferably 100 μm to 7 mm, and more preferably 200 μm to 5 mm. As used herein, the term "average grain size" refers to the average diameter calculated after the breadcrumbs are sieved in levels and fractionated.

Also, the breadcrumbs according to the present invention have a bulk density of 270 to 600 ml/100 g. This means, as is clear from the method for measuring the bulk density described below, that the volume of 100 g of breadcrumbs placed in a 1000 mL measuring cylinder under no load is 270 to 600 ml. If the bulk density of the breadcrumbs is less than 270 ml/100 g, the adhesion of the breadcrumbs to the food material decreases, and the texture of the breadcrumbs is excessively hard. On the other hand, if the bulk density of the breadcrumbs exceeds 600 ml/100 g, the breadcrumbs that have adhered to the food material are likely to separate from the food material, and the texture of the breadcrumbs is excessively soft. In either case, the cooked breadcrumb-coated food item obtained using the breadcrumbs described above may have a poor visual appearance and a poor texture. Particularly, in terms of visual appearance of the coating, the adhesion of the coating may not be uniform, and the breadcrumbs may not sufficiently stand upright, and thus a visual appearance preferable as a fried food may not be obtained. The bulk density of the breadcrumbs is preferably 350 to 590 ml/100 g, and more preferably 450 to 580 ml/100 g.

<Method for Measuring Bulk Density>

A commercially available 1000 mL measuring cylinder that has an upper opening (for example, available from Nihon Keiryoki Kogyo Co., Ltd.) is placed standing up on a horizontal surface, and 100 g of breadcrumbs is gently introduced into the measuring cylinder through the upper opening of the measuring cylinder. After that, the upper opening of the measuring cylinder is closed with a lid, and the measuring cylinder in this state is gently turned upside down twice and then left standing so as to form a pile of breadcrumbs in which a large amount of breadcrumbs are accumulated in the measuring cylinder. The top of the formed pile of breadcrumbs is lightly leveled to be visually horizontal while taking care not to affect measured values, and the position of the leveled top of the pile of breadcrumbs in the measuring cylinder is read based on the scales of the measuring cylinder. Then, the volume of the pile of breadcrumbs is obtained from the value read from the scales of the measuring cylinder, and the bulk density of the breadcrumbs is calculated. If an external force is applied to the pile of breadcrumbs, the pile of breadcrumbs may collapse, which may affect the measurement of values for the bulk density. Accordingly, as much care as possible should be taken so as not to apply an external force to the pile of breadcrumbs.

The breadcrumbs according to the present invention can essentially be produced according to a known method for producing dried breadcrumbs such as a straight dough method or a sponge dough method. That is, the breadcrumbs according to the present invention can be produced by sieving dried breadcrumbs produced using a conventional method into a plurality of fractions according to a conventional method, mixing the plurality of fractions as appropriate, and adjusting the grain size distribution and the bulk density of the mixture to be within the specific ranges.

A typical method for producing dried breadcrumbs that can be used in the present invention includes the steps of subjecting a dough prepared by adding water to a mixture of bread ingredients and kneading the mixture to primary fermentation, (division), (rounding), secondary fermentation, shaping, (placing in a baking pan), (final fermentation), and baking, so as to obtain a loaf of bread, thereafter cooling and crumbling the loaf of bread to obtain undried breadcrumbs, and drying the obtained undried breadcrumbs (the steps within parentheses may be omitted). In the production method, the fermentation steps such as the primary fermentation and the secondary fermentation may be omitted, and may be replaced by the step of expanding the dough using a leavening agent according to the state of the dough or at the baking stage. As the method for baking dough, there is a roasting-type dough baking method, an electrode-type dough baking method, and other methods. In the present invention, breadcrumbs obtained through any type of method can be used. Also, mixed breadcrumbs prepared by mixing breadcrumbs obtained through any of the methods at a desired ratio may be used. Also, in the present invention, basically, as the bread ingredients, or in other words, as the breadcrumb ingredients, various types of ingredients that can be used to make this type of breadcrumbs can be used without any particular limitation. Typical breadcrumb ingredients include wheat flours such as a soft wheat flour, a medium wheat flour, a semi-strong wheat flour, a strong wheat flour, and a durum wheat flour as the main ingredient, and further include a yeast, a yeast food, a sugar, a starch, table salt, gluten, a soybean powder, an emulsifier, a thickener, a shortening, a pigment, a pH adjusting agent, and the like.

From the viewpoint of balancing the adhesion of the breadcrumbs to the food material and the texture of the cooked breadcrumb-coated food item obtained using the breadcrumbs, the breadcrumbs according to the present invention preferably have a moisture content of 6 to 14%. In particular, the moisture content is preferably 7 to 13%. If the moisture content of the breadcrumbs is too low, the texture of the cooked breadcrumb-coated food item may be hard. If the moisture content of the breadcrumbs is too high, the adhesion of the breadcrumbs to the food material may be low. The moisture content of the breadcrumbs can be adjusted by, for example, adjusting the conditions for drying undried breadcrumbs as appropriate in the method for producing dried breadcrumbs described above.

In the present invention, the term "moisture content" refers to the mass decreasing rate of a sample (breadcrumbs or a breadcrumb mix) when the sample is heated and dried under specified conditions. For example, the moisture content can be determined by the percentage of weight loss when 3 g of the sample is heated and dried at 105° C. for 3 hours relative to the weight (3 g) of the sample before drying.

The present invention encompasses a breadcrumb mix that contains the breadcrumbs according to the present invention described above (hereinafter also referred to as "specific breadcrumbs"). The breadcrumb mix according to the present invention contains, in addition to the specific breadcrumbs, one or more selected from the group consisting of a protein material and a thickener. The specific breadcrumbs by themselves have a high level of adhesion to the food material. Accordingly, with an easy operation of simply applying the specific breadcrumbs of the present invention directly to the food material without performing preliminary operations of applying a coating powder to the food material and dipping the food material in an egg mixture or a liquid batter, it is possible to easily produce a high-quality cooked breadcrumb-coated food item whose coating is unlikely to separate from the food material before and after cooking such as deep frying and that has a good visual appearance and a good texture. The adhesion of the breadcrumb mix of the present invention to the food material is further improved as compared with that of the specific breadcrumbs. Hereinafter, the breadcrumb mix according to the present invention will be described.

The amount of the specific breadcrumbs in the breadcrumb mix of the present invention is preferably 70 to 99 mass %, and more preferably 75 to 95 mass % relative to the total mass of the breadcrumb mix. If the amount of the specific breadcrumbs in the breadcrumb mix is too small, there is little meaning in using the specific breadcrumbs. If the amount of the specific breadcrumbs is too large, the relative amount of additional components such as a protein material and a thickener decreases, and there may be no substantial difference from that when the specific breadcrumbs are used alone.

Examples of the protein material that can be used in the breadcrumb mix of the present invention include: wheat proteins such as gluten, gliadin, and glutenin; egg proteins such as whole egg, egg white, and egg yolk; milk proteins such as skim milk and whey protein; soybean protein, gelatin, and the like. These may be used alone or in a combination of two or more. Among these protein materials, in particular, it is preferable to use a wheat protein and an egg protein. Specifically, it is preferable to use gluten and a dried egg white powder.

Examples of the thickener that can be used in the breadcrumb mix of the present invention include a pregelatinized starch, a processed starch, glucomannan, agar, curdlan, sodium alginate, carrageenan, gellan gum, xanthan gum, pectin, gelatin, and the like. These may be used alone or in a combination of two or more. Among these thickeners, in particular, it is preferable to use a pregelatinized starch and glucomannan.

The amount of each of the protein material and the thickener in the breadcrumb mix of the present invention is preferably 1 to 30 mass %, and more preferably 5 to 25 mass % relative to the total mass of the breadcrumb mix. If the amount of each of the protein material and the thickener in the breadcrumb mix is too small, there is little meaning in using the protein material and the thickener. If the amount of each of the protein material and the thickener in the breadcrumb mix is too large, the texture of the cooked breadcrumb-coated food item obtained using the breadcrumb mix may be hard. In the case where the protein material and the thickener are used in combination, the mass content ratio between the protein material and the thickener (protein material:thickener) is preferably 90:1 to 1:3, and more preferably 20:1 to 1:2.

The breadcrumb mix of the present invention may contain additional components other than the aforesaid components (the specific breadcrumbs, the protein material, and the thickener) as long as the visual appearance and the texture of the cooked breadcrumb-coated food item obtained using the breadcrumb mix of the present invention are not impaired. Examples of additional components include seasonings, emulsifiers, fats, sweetening agents, table salt, spices, pigments, enzymes, flavorings, and the like. One or more may be selected from the above-listed components according to the type of intended cooked breadcrumb-coated food item. The amount of additional components is preferably 20 mass % or less relative to the total mass of the breadcrumb mix. The breadcrumb mix of the present invention can be produced by mixing various types of ingredients such as the specific breadcrumbs, and is in the form of powder at room temperature and atmospheric pressure.

The moisture content of the breadcrumb mix of the present invention is preferably 6 to 14%, and more preferably 7 to 13%. The moisture content of the breadcrumb mix is substantially the same as the moisture content of the breadcrumbs contained in the breadcrumb mix. Accordingly, in order for the breadcrumb mix to have a moisture content of 6 to 14%, it is normally sufficient to use breadcrumbs that have a moisture content of 6 to 14%.

The breadcrumbs and the breadcrumb mix according to the present invention both can be used in a cooking method in which known preliminary operations of applying a coating powder to a raw food material and dipping the raw food material in an egg mixture, a liquid batter or the like are performed, then the breadcrumbs or the breadcrumb mix is applied to the raw food material, and the raw food material is cooked. However, the breadcrumbs and the breadcrumb mix according to the present invention both can also be used in a simple cooking method in which the breadcrumbs or the breadcrumb mix is applied directly to a raw food material without performing the preliminary operations described above, and then cooking the raw food material. Also, in the cooking methods described above, the amount of oil used in cooking does not matter. The breadcrumbs and the breadcrumb mix according to the present invention can be used in both shallow frying that uses a relatively small amount of oil and deep frying that uses a relatively large amount of oil. Furthermore, the breadcrumbs and the breadcrumb mix according to the present invention can also be used in non-fry cooking that uses an oven or the like.

Shallow frying that uses a small amount of oil can be performed as follows, for example. The breadcrumbs or the breadcrumb mix of the present invention is applied directly to a raw food material, and then the raw food material is cooked in a small amount of oil (specifically, preferably 50 ml or less, and more preferably 30 ml or less relative to 100 g of the food material) using cooking equipment such as a pan, a frying pan, a hot plate, or an oven according to a conventional method. Specifically, for example, the food material coated with the breadcrumbs or the breadcrumb mix of the present invention is cooked in a small amount of oil lightly spread on a piece of cooking equipment. Deep frying that uses a large amount of oil can be performed as follows, for example. The breadcrumbs or the breadcrumb mix of the present invention is applied directly to a raw food material, and then the raw food material is placed in a large amount of oil (specifically, preferably a depth of 2 cm or more, and more preferably a depth of 2 to 6 cm relative to 100 g of the food material) in an oil vat (a deep fry pan or the like), and cooked according to a conventional method.

There is no particular limitation on the food material to which the breadcrumbs and the breadcrumb mix according to the present invention can be applied. For example, various food materials including: meats such as chicken, pork, beef, lamb, and chevon; seafood such as squid, prawn, and horse mackerel; and vegetables can be used. Also, there is no particular limitation on the oil used in deep frying as long as ordinary cooking oil is used. Examples of the ordinary cooking oil include: vegetable oils such as rapeseed oil, soybean refined oil, rice oil, and sesame oil; and animal-based oils such as lard.

The present invention encompasses a breadcrumb-coated food item in which the breadcrumbs or the breadcrumb mix of the present invention is attached to the surface of a food material, and the breadcrumb-coated food item according to the present invention may be refrigerated or frozen. By cooking the breadcrumb-coated food item of the present invention using shallow frying, deep frying, or the like, a cooked breadcrumb-coated food item is obtained.

As described above, because the grain size distribution and the bulk density are within the specific ranges described above, the breadcrumbs according to the present invention are particularly suitable to be used by being shaken out of a shaker container through a shake-out hole of the shaker container and applied directly to a food material. The same applies to the breadcrumb mix of the present invention that contains the breadcrumbs of the present invention. That is, the breadcrumbs and the breadcrumb mix according to the present invention may be collectively referred to as "a breadcrumb powder to be shaken out". The present invention encompasses, as an invention that utilizes the characteristics of the breadcrumbs or the breadcrumb mix of the present invention as the breadcrumb powder to be shaken out, a breadcrumb powder shaker container that includes: the breadcrumbs or the breadcrumb mix of the present invention; and a shaker container that contains a breadcrumb powder to be shaken out including the breadcrumbs or the breadcrumb mix, the shaker container including a shake-out hole through which the breadcrumb powder is shaken out. As used herein, the term "shake out" means discharging the breadcrumbs or the breadcrumb mix (the breadcrumb powder) from the shaker container with a shake-out hole to the outside through the shake-out hole from a state in which the breadcrumbs or the breadcrumb mix (the breadcrumb powder) is contained in the shaker container by shaking the shaker container. Specifically, for example, in the case where the shake-out hole is formed in an upper portion of the shaker container, a method may be used in which the breadcrumb powder that is the content material contained in the shaker container is shaken out in small portions through the shake-out hole by shaking the shaker container held in a hand with the upper portion of the shaker container facing directly downward or obliquely downward as needed.

Figures 1A, 1B:
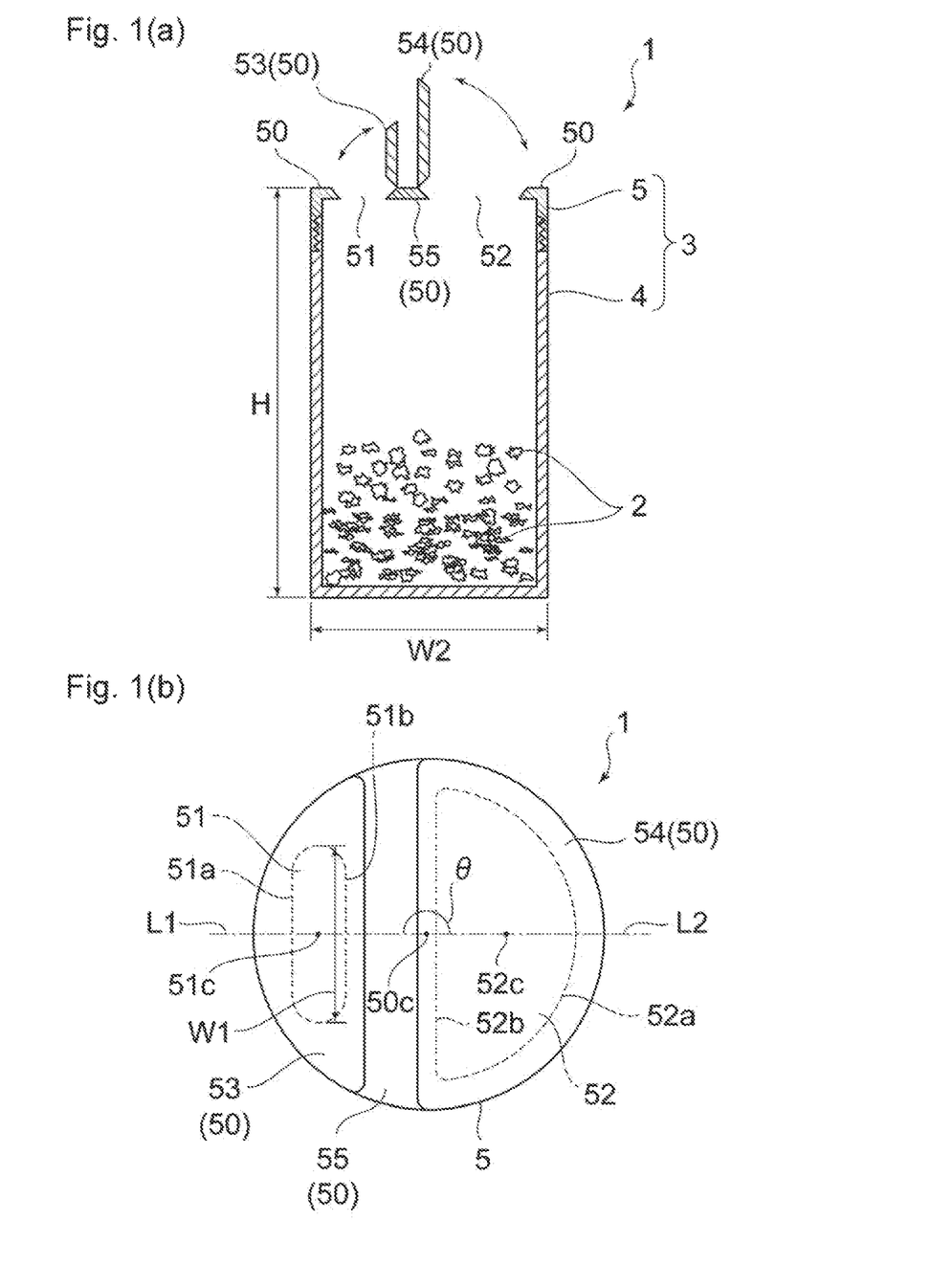
FIG. 1(a) is a schematic vertical cross-sectional view of a breadcrumb or breadcrumb mix container according to an embodiment of the present invention.
FIG. 1(b) is a schematic top view of the container shown in FIG. 1(a), specifically, a diagram showing a state in which a shake-out hole and a spoon insertion hole of a cap member of the container are closed by an open-and-close cap.

Hereinafter, the breadcrumb powder shaker container according to the present invention will be described by way of a preferred embodiment thereof with reference to the drawings. FIG. 1 shows a container 1 that is a breadcrumb powder shaker container according to an embodiment of the present invention. As shown in FIG. 1(a), the container 1 includes a breadcrumb powder 2 to be shaken out and a shaker container 3 that contains the breadcrumb powder 2. The breadcrumb powder 2 that is the content material contained in the shaker container 3 includes the breadcrumbs or the breadcrumb mix of the present invention described above. There is no particular limitation on the proportion of the breadcrumbs or the breadcrumb mix of the present invention relative to the total mass of the breadcrumb powder 2, but from the viewpoint of more reliably providing the advantageous effects expected from the container 1, the higher the proportion of the breadcrumbs or the breadcrumb mix of the present invention, the more preferable it is. It is most preferable that 100 mass % of the breadcrumb powder 2, or in other words, the breadcrumb powder 2 is composed only of the breadcrumbs or the breadcrumb mix of the present invention.

As shown in FIG. 1(a), the shaker container 3 includes: a cylindrical self-standing container body 4 that has an upper opening; and a cap member 5 that closes the upper opening of the container body 4. A male thread portion that has thread grooves extending along the circumferential direction of the container body 4 is formed on the upper portion side of the outer circumferential surface of the container body 4. When a female thread portion that is formed on the inner circumferential surface of the cap member 5 is screwed onto the male thread portion, the cap member 5 is removably fixed to the container body 4. The container body 4 includes a single open space portion, and the breadcrumb powder 2 to be shaken out is contained in the space portion.

The cap member 5 includes a flat top plate portion 50 that covers the upper opening of the container body 4. A shake-out hole 51 through which the breadcrumb powder 2 is shaken out of the shaker container is formed in the top plate portion 50. The shake-out hole 51 of the container 1 has an elliptical shape (elongated elliptical shape) when viewed in a plan view as shown in FIG. 1(b), and includes an outer edge 51a and an inner edge 51b that are parallel straight lines extending in the lengthwise direction.

Also, in the top plate portion 50 of the container 1, in addition to the shake-out hole 51, a spoon insertion hole 52 is formed. The spoon insertion hole 52 has a semicircular shape when viewed in a plan view as shown in FIG. 1(b), and includes an arc-shaped outer edge 52a extending along the circumferential direction of the top plate portion 50 and a linear inner edge 52b. When viewed in a plan view as shown in FIG. 1(b), the shake-out hole 51 is provided on one side of the top plate portion 50 in the radial direction, and the spoon insertion hole 52 is provided on the other side. More specifically, the shake-out hole 51 and the spoon insertion hole 52 are provided such that a straight line L1 passing through a center 50c of the top plate portion 50 and a center 51c of the shake-out hole 51 and a straight line L2 passing through the center 50c and a center 52c of the spoon insertion hole 52 form an angle (central angle) θ of 180 degrees.

The top plate portion 50 of the cap member 5 includes an open-and-close cap 53 for closing the shake-out hole 51 and an open-and-close cap 54 for closing the spoon insertion hole 52. More specifically, a non-open-and-close portion 55 that does not have an open and close function and constantly closes the upper opening of the container body 4 is provided between the shake-out hole 51 and the spoon insertion hole 52 of the top plate portion 50. Each of the open-and-close caps 53 and 54 is provided by fixing the inner end of the open-and-close cap in the radial direction of the top plate portion 50 to the non-open-and-close portion 55 such that the open-and-close cap is capable of pivoting upward of the shake-out hole 51 or the spoon insertion hole 52 about the fixed portion that is fixed to the non-open-and-close portion 55. There is no particular limitation on the pivoting mechanism of the open-and-close caps 53 and 54, and a mechanism that is used to open and close the cap member of this type of shaker container can be used without any particular limitation. Because the container 1 includes the open-and-close caps 53 and 54 described above, problems such as the breadcrumb powder 2 that is the content material becoming moist, and entry of a foreign matter into the container body 4 can be prevented.

To shake out the breadcrumb powder 2 from the container 1 and apply it to the food material, the outer end side of the open-and-close cap 53 closing the shake-out hole 51 in the radial direction of the top plate portion 50 (the side opposite to the fixed portion that is fixed to the non-open-and-close portion 55) is pulled upward so as to expose the shake-out hole 51, and the container 1 in this state is held in a hand so as to direct the shake-out hole 51 toward the food material provided below the container 1, and lightly shaken as needed. In doing so, as shown in FIG. 2, the breadcrumb powder 2 that is the content material is shaken out through the shake-out hole 51, and falls on and adheres to the surface of the food material (not shown).

Figure 2:
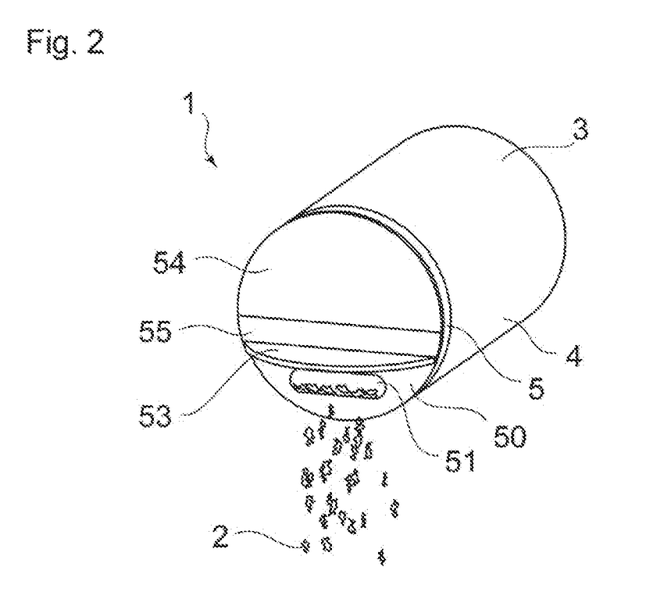
FIG. 2 is a diagram showing the container shown in FIG. 1 when in use.

Also, with the container 1, as the method for taking out the breadcrumb powder 2 from the container body 4, other than the method shown in FIG. 2 in which the breadcrumb powder 2 is shaken out through the shake-out hole 51, a method for taking out the breadcrumb powder 2 using a spoon may be used. The latter method is performed by using a spoon (not shown) that includes a scoop portion at the leading end of a handle, inserting the scoop portion of the spoon into the spoon insertion hole 52, scooping the breadcrumb powder 2 in the container body 4 with the scoop portion, and removing the spoon from the container body 4. In this case, in the container body 4, a heaping of breadcrumb powder 2 is placed on the scoop portion of the spoon, then, the scoop portion is drawn toward the spoon insertion hole 52, and the edge of the scoop portion on which the breadcrumb powder 2 is placed is brought into contact with the inner edge 52b of the spoon insertion hole 52 when the scoop portion is passed through the spoon insertion hole 52. By doing so, a portion of the breadcrumb powder 2 (the upper portion of the heaping of the breadcrumb powder) on the scoop portion can be scraped off. Accordingly, by using a measuring spoon that has a scoop portion of a predetermined volume, a predetermined amount of breadcrumb powder 2 can be taken out accurately and easily.

A main feature of the container 1 is that the shake-out hole 51 has a maximum diametric length W1 (see FIG. 1(b)) of 10 to 55 mm, and preferably 18 to 40 mm. As used herein, "the maximum diametric length of the shake-out hole" refers to the length of a portion of the shake-out hole 51 that has the largest diametric length when viewed in a plan view as shown in FIG. 1(b) (in a top view of the container 1). In other words, the maximum diametric length W1 of the shake-out hole 51 is, when an imaginary line extending in any direction passes through the shake-out hole 51 is drawn in the plan view, the largest length of a portion of the imaginary line that overlaps the shake-out hole 51. The maximum diametric length W1 of the shake-out hole 51 being in the specific range described above in combination with the breadcrumb powder 2 that is the content material including the breadcrumbs or the breadcrumb mix of the present invention whose grain size distribution and the bulk density are within the specific ranges, an appropriate amount of breadcrumb powder 2 is smoothly shaken out through the shake-out hole 51, and a problem in that the shaken-out breadcrumb powder 2 scatters around the food material can be effectively suppressed, and an appropriate amount of breadcrumb powder 2 can be efficiently applied to the food material. If the maximum diametric length W1 of the shake-out hole 51 is less than 10 mm, problems such as the amount of shaken-out breadcrumb powder 2 being too small, and the shake-out hole 51 being easily clogged by the breadcrumb powder 2 may occur. If the maximum diametric length W1 exceeds 55 mm, an excessive amount of breadcrumb powder 2 may be shaken out with just a light shaking of the container 1, which is wasteful, and a large amount of breadcrumb powder 2 may scatter around the food material, which is a mess.

When the amount of breadcrumb powder 2 shaken out through the shake-out hole 51 in the operation of shaking the container 1, or in other words, the operation of holding the container 1 in the hand and tilting the container 1 such that the upper portion side, specifically, the shake-out hole 51 side of the top plate portion 50 is directed relatively downward, and the lower side is positioned relatively above the food material is performed only once is "appropriate", which is suitable for obtaining a high-quality cooked breadcrumb-coated food item with a good visual appearance and a good texture, the burden of performing the operation of applying the breadcrumbs to the food material is reduced, and thus a cooked breadcrumb-coated food item can be efficiently produced. As used herein, "an appropriate amount of breadcrumb powder" refers to, although it varies depending on the shape and size of the food material, the type of intended cooked breadcrumb-coated food item, and the like, for example, about 2 to 30 g of breadcrumbs for a food material that has a surface area of about 50 to 500 cm$^2$. Also, from the viewpoint of simplifying the breadcrumb application operation, the appropriate amount of breadcrumb powder (for example, about 2 to 30 g of breadcrumb powder) is preferably shaken out of the container 1 by performing the operation of shaking the container 1 about 3 to 10 times. Accordingly, in the container 1, it is preferable to adjust the maximum diametric length W1 of the shake-out hole 51 such that the amount of breadcrumb powder 2 shaken out through the shake-out hole 51 in a single operation of shaking the container 1 is about 0.5 to 10 g.

In the present invention, the shape of the shake-out hole 51 when viewed in a plan view is not limited to the elliptical shape as shown in FIG. 1(b), and the shake-out hole 51 may have any shape. For example, the shake-out hole 51 may have a circular shape, a triangular shape, a rectangular shape, or a polygonal shape having five or more sides. Also, in the shake-out hole 51 having the elliptical shape shown in FIG. 1(b), the outer edge 51a and the inner edge 51b extending in the lengthwise direction are both linear, but the two edges 51a and 51b may be curved lines that extend along the circumferential direction of the circular top plate portion 50, and may be curved outward in the radial direction of the top plate portion 50. Also, the number of shake-out holes 51 formed in the container 1 is not limited to one, and may be more than one. The number of shake-out holes 51 formed in the container 1 is preferably one to four, and more preferably one to three. In the case where a plurality of shake-out holes 51 are formed in the container 1, the total amount of breadcrumb powder 2 shaken out through the plurality of shake-out holes 51 is preferably in a range of about 2 to 8 g as described above.

Also, in the present invention, the shape of the container 1 (the container body 4) is not limited to the cylindrical shape as shown in the diagram, and the container 1 (the container body 4) may have any shape. For example, the container 1 (the container body 4) may be a self-standing tubular body whose upper opening has an elliptical shape, a triangular shape, a rectangular shape, or a polygonal shape having five or more sides when viewed in a plan view, or may be a self-standing bag (a so-called stand-up pouch). Also, it is preferable that the container 1 (the container body 4) is sized to be held in one hand. Specifically, as shown in FIG. 1(a), the container 1 (the container body 4) has, for example, a height H of 100 to 400 mm, and a width (the length in a direction perpendicular to the height direction, for example, the diameter or the length of one side) W2 of 50 to 300 mm. Also, the volume of the inner space of the container body 4 may be set to, for example, about 200 to 3000 mL, which is the volume that allows about 80 to 500 g of breadcrumb powder to be contained. Also, there is no particular limitation on the material of the container body 4 and the cap member 5 as long as a material that is unlikely to cause deterioration of the breadcrumb powder and is unlikely to deform during the operation of shaking is used. For example, plastic, metal, or paper may be used.

Also, in the embodiment shown in FIG. 1(b), the shake-out hole 51 and the spoon insertion hole 52 are offset by a central angle θ of 180 degrees from each other, but the two holes 51 and 52 may be offset by a central angle θ of 90 to 180 degrees. Also, the spoon insertion hole 52 may be omitted. Also, there is no particular limitation on the mechanism for opening and closing the two holes 51 and 52. For example, the mechanism may be configured in the form of a fitted lid or a screw cap, or in the form of a sliding lid or a flap lid that can be opened and closed conveniently with one hand.

EXAMPLES

Hereinafter, the present invention will be described in further detail by way of examples. It is to be noted, however, that the present invention is not limited to the examples given below.

Examples 1 to 17 and Comparative Examples 1 to 5

As the main ingredients, a wheat flour, a yeast, a yeast food and a starch were mixed at a predetermined ratio, and a predetermined amount of water was added to the obtained mixture and kneaded so as to obtain a dough. The dough was subjected to primary fermentation, secondary fermentation, shaping, and baking according to a conventional method so as to produce a loaf of bread. The obtained loaf of bread was crumbled and dried to obtain breadcrumbs with a moisture content of 10%. The obtained breadcrumbs were sieved into a plurality of fractions according to the grain size, and the plurality of fractions were re-mixed to obtain the breadcrumbs having a grain size distribution and a bulk density shown in Tables 1 and 2 given below.

Test Example 1

Breadcrumbs used as a test sample were spread on a tray, and a cut of pork loin (with a thickness of about 1.2 cm and a weight of about 100 g a cut) used as a raw food material was placed on the breadcrumbs. Then, the breadcrumbs were applied directly to the entire surface of the pork loin cut by rolling the pork loin cut in the breadcrumbs a plurality of times. The pork loin cut with breadcrumbs applied in the manner described above was placed in an oil vat heated to 170° C. and deep fried for 3 minutes, and a Japanese-style pork cutlet (a cooked breadcrumb-coated food item) was thereby obtained. The visual appearance of the Japanese-style pork cutlet was evaluated by 10 panelists based on the following evaluation scale immediately after cooking. Then, the Japanese-style pork cutlet was eaten by the 10 panelists so as to evaluate the food texture based on the following evaluation scale. The results are shown in Tables 1 and 2 given below as the average points of 10 panelists (with five points being highest).

Evaluation Scale for Visual Appearance 5 points: The coating (breadcrumbs) uniformly adhered to the entire food material, the breadcrumbs were sufficiently upright, and the visual appearance was very good.

4 points: The coating (breadcrumbs) adhered to the entire food material, and the visual appearance was good.

3 points: The coating (breadcrumbs) had a thin portion(s), but the visual appearance was somewhat good.

2 points: The coating (breadcrumbs) had a thin portion(s), and the visual appearance was poor.

1 point: The coating (breadcrumbs) had a thin or separated portion(s), and the visual appearance was very poor.

Evaluation Scale for Texture 5 points: The coating was sufficiently crispy, and the texture was very good.

4 points: The coating was crispy, and the texture was good.

3 points: The coating was less crispy, but the texture was somewhat good.

2 points: The crispiness of the coating was either weak or hard, and the texture was poor.

1 point: The coating was not crispy or was too hard, and the texture was very poor.

TABLE 1

| | | Example | | | | | | | | | Comparative Example | | |
|---|---|---|---|---|---|---|---|---|---|---|---|---|---|
| | | 1 | 2 | 3 | 4 | 5 | 6 | 7 | 8 | 9 | 1 | 2 | 3 |
| Grain size distribution of breadcrumbs (mass %) | A fraction of breadcrumbs with a grain size of 2.36 mm or more | 8 | 12 | 20 | 21 | 12 | 12 | 12 | 12 | 12 | 7 | 22 | 12 |
| | A fraction of breadcrumbs with a grain size of 1.18 mm or less | 36 | 36 | 36 | 36 | 15 | 18 | 22 | 43 | 45 | 36 | 36 | 47 |
| Bulk density of breadcrumbs (ml/100 g) | | 550 | 550 | 550 | 550 | 550 | 550 | 550 | 550 | 550 | 550 | 550 | 550 |
| Evaluation | Visual appearance of Japanese-style pork cutlet | 4.0 | 4.4 | 4.3 | 4.2 | 3.9 | 4.1 | 4.3 | 4.3 | 4.2 | 3.3 | 3.0 | 3.2 |
| | Texture of Japanese-style pork cutlet | 3.9 | 4.4 | 4.2 | 4.2 | 4.0 | 4.1 | 4.2 | 4.3 | 4.1 | 3.1 | 3.1 | 3.0 |

As can be seen from Table 1, the breadcrumbs of the examples were excellent in terms of both visual appearance and texture as compared with the breadcrumbs of the comparative examples. The reason that the use of the breadcrumbs of the comparative examples resulted in Japanese-style pork cutlets having a poor visual appearance and a poor texture is surmised that the proportion of a fraction of breadcrumbs having a grain size of 2.36 mm or more was outside the range of 8 to 21 mass % in Comparative Examples 1 and 2, and the proportion of a fraction of breadcrumbs having a grain size of 1.18 mm or less was greater than 45 mass % in Comparative Example 3. Also, from the fact that the breadcrumbs of Example 5 had the lowest evaluation points among the examples shown in Table 1, it can be seen that the proportion of a fraction of breadcrumbs that have a grain size of 1.18 mm or less is preferably in the range of about 20 to 45 mass % as used in Examples 6 to 9, and more preferably in the range of about 22 to 43 mass % as used in Examples 7 and 8.

TABLE 2

|  |  | Example ||||||||  Comparative Example ||
|  |  | 10 | 11 | 12 | 13 | 14 | 15 | 16 | 17 | 4 | 5 |
|---|---|---|---|---|---|---|---|---|---|---|---|
| Grain size distribution of breadcrumbs (mass %) | A fraction of breadcrumbs with a grain size of 2.36 mm or more | 12 | 12 | 12 | 12 | 12 | 12 | 12 | 12 | 12 | 12 |
|  | A fraction of breadcrumbs with a grain size of 1.18 mm or less | 36 | 36 | 36 | 36 | 36 | 36 | 36 | 36 | 36 | 36 |
| Bulk density of breadcrumbs (ml/100 g) |  | 270 | 320 | 370 | 450 | 570 | 580 | 590 | 600 | 250 | 610 |
| Evaluation | Visual appearance of Japanese-style pork cutlet | 4.0 | 4.0 | 4.2 | 4.3 | 4.4 | 4.3 | 4.1 | 4.0 | 3.0 | 3.1 |
|  | Texture of Japanese-style pork cutlet | 3.9 | 4.0 | 4.1 | 4.2 | 4.3 | 4.2 | 4.2 | 3.9 | 2.9 | 2.9 |

From the results shown in Table 2, the bulk density of the breadcrumbs is preferably in the range of 270 to 600 ml/100 g as used in Examples 10 to 17, more preferably in the range of about 370 to 590 ml/100 g as used in Examples 12 to 16, and even more preferably in the range of about 450 to 570 ml/100 g as used in Examples 13 and 14.

Examples 18 to 29

Coating materials composed of breadcrumbs or a breadcrumb mix were prepared by mixing the breadcrumbs (the specific breadcrumbs) with additional ingredients as appropriate. The following additional ingredients were used:
  wheat gluten (A-Glu G available from Glico Nutrition Co., Ltd.);
  dried egg white powder (dried egg white powder available from Kewpie Corporation);
  pregelatinized starch (Matsunorin available from Matsutani Chemical Industry Co., Ltd.); and
  glucomannan (Super Mannan available from Ogino Shoten KK).

Using the coating material of each example, a Japanese-style pork cutlet (a cooked breadcrumb-coated food) was produced in the same manner as in Test Example 1 described above, and the visual appearance and the texture of the Japanese-style pork cutlet were evaluated. The results are shown in Table 3 given below as the average points of 10 panelists (with five points being highest).

TABLE 3

|  |  |  | Example |||||||||||||
|  |  |  | 3 | 18 | 19 | 20 | 21 | 22 | 23 | 24 | 25 | 26 | 27 | 28 | 29 |
|---|---|---|---|---|---|---|---|---|---|---|---|---|---|---|---|
| Composition of coating material (mass %) | Breadcrumbs |  | 100 | 65 | 70 | 85 | 85 | 95 | 99 | 75 | 75 | 85 | 85 | 85 | 85 |
|  | Protein material | Wheat gluten | — | 35 | 30 | 15 | — | 5 | 1 | — | — | — | — | 10 | — |
|  |  | Dried egg white powder | — | — | — | — | 15 | — | — | — | — | — | — | — | 10 |
|  | Thickener | Pregelatinized starch | — | — | — | — | — | — | — | 25 | — | 15 | — | 5 | — |
|  |  | Glucomannan | — | — | — | — | — | — | — | — | 25 | — | 15 | — | 5 |
|  | Total |  | 100 | 100 | 100 | 100 | 100 | 100 | 100 | 100 | 100 | 100 | 100 | 100 | 100 |
| Grain size distribution of breadcrumbs (mass %) | A fraction of breadcrumbs with a grain size of 2.36 mm or more |  | 20 | 20 | 20 | 20 | 20 | 20 | 20 | 20 | 20 | 20 | 20 | 20 | 20 |
|  | A fraction of breadcrumbs with a grain size of 1.18 mm or less |  | 36 | 36 | 36 | 36 | 36 | 36 | 36 | 36 | 36 | 36 | 36 | 36 | 36 |
| Bulk density of breadcrumbs (ml/100 g) |  |  | 550 | 550 | 550 | 550 | 550 | 550 | 550 | 550 | 550 | 550 | 550 | 550 | 550 |
| Evaluation | Visual appearance of Japanese-style pork cutlet |  | 4.3 | 4.3 | 4.4 | 4.6 | 4.5 | 4.5 | 4.4 | 4.4 | 4.4 | 4.5 | 4.5 | 4.6 | 4.7 |
|  | Texture of Japanese-style pork cutlet |  | 4.2 | 4.2 | 4.4 | 4.5 | 4.5 | 4.3 | 4.3 | 4.3 | 4.2 | 4.5 | 4.6 | 4.5 | 4.7 |

Comparison between Example 3 and other examples in Table 3 clearly shows that mixing the specific breadcrumbs with a protein material and/or a thickener is effective in improving the visual appearance and the texture of the cooked breadcrumb-coated food item.

It can also be seen that it is particularly preferable that the amount of protein material in the breadcrumb mix that is the coating material is in the range of about 15 to 30 mass % as used in Examples 19 to 21. The reason is surmised to be the same as that explained for the amount of thickener in the breadcrumb mix. Also, the breadcrumbs of Examples 26 and 27 had the highest evaluation points, from which it can be seen that it is particularly effective to use a protein material and a thickener in combination.

Examples 30 to 37 and Comparative Examples 6 and 7

Plastic shaker containers configured essentially the same as the shaker container 3 shown in FIG. 1 were produced.

Then, in each container, the coating material (the breadcrumb mix) of Example 26 was placed in an amount of 120 g as the breadcrumb powder to be shaken out, and breadcrumb powder shaker containers were thereby obtained. The shaker container of each container had a cylindrical shape as with the shaker container 3 shown in FIG. 1, and had a height H (see FIG. 1(a)) of 150 mm and a width W2 (see FIG. 1(a)) of 80 mm.

Test Example 2

A mark was made on the flat, hard and smooth upper surface of a test bench, and a test sample container was held in a hand above the mark at a position 10 cm away from the mark, with the top plate portion in which a shake-out hole is formed facing upward. Then, the operation (shaking operation) of quickly turning the container upside down from the state in which the container was held in the hand and supported in the air, such that the top plate portion opposed the mark directly below the container was performed once, and the amount of coating material (breadcrumb mix) used as the content material shaken out through the shake-out hole by the single operation was measured as "shaken-out amount". The set of operations described above was performed ten times using each test sample (breadcrumb powder shaker container). Then, the average value of the measured values using each test sample was defined as the shaken-out amount of the test sample. Also, furthermore, for each test sample container, "ease of shaking out" was evaluated by a sensory test based on the position and amount of the coating material shaken out of the container on the test bench. The following evaluation scales were used to evaluate "shaken-out amount" and "ease of shaking out" described above. The results are shown in Table 4 given below.

Evaluation Scale for Shaken-Out Amount

A (highest evaluation point): The shaken-out amount was 1.5 g to 5.5 g.

B: The shaken-out amount was 0.5 g or more and less than 1.5 g, or greater than 5.5 g and 10.0 g or less.

C (lowest evaluation point): The shaken-out amount was less than 0.5 or greater than 10.0 g.

Evaluation Scale for Ease of Shaking Out

A (highest evaluation point): The content material was appropriately discharged to the intended position without any waste, and the container was very convenient to use.

B: The content material was discharged to the intended position, and the container was convenient to use.

C (lowest evaluation point): The content material was discharged to the intended position, but the shaking operation needed to be performed much more times, which required much time and effort, and the container was inconvenient to use, or the breadcrumbs scattered around the intended position and the container was inconvenient to use.

TABLE 4

| | | | Example | | | | | | | | Comparative Example. | |
|---|---|---|---|---|---|---|---|---|---|---|---|---|
| | | | 30 | 31 | 32 | 33 | 34 | 35 | 36 | 37 | 6 | 7 |
| Content material | Breadcrumbs (mass %) | | 100 | 100 | 100 | 100 | 100 | 100 | 100 | 100 | 100 | 100 |
| | Grain size distribution of breadcrumbs (mass %) | A fraction of breadcrumbs with a grain size of 2.36 mm or more | 20 | 20 | 20 | 20 | 2.0 | 20 | 20 | 20 | 20 | 2.0 |
| | | A fraction of breadcrumbs with a grain size of 1.18 mm or less | 36 | 36 | 36 | 36 | 36 | 36 | 36 | 36 | 36 | 36 |
| | Bulk density of breadcrumbs (ml/100 g) | | 550 | 550 | 550 | 550 | 550 | 550 | 550 | 550 | 550 | 550 |
| Shaker container | Maximum diametric length of shake-out hole (mm) | | 10 | 18 | 22 | 26 | 30 | 34 | 40 | 55 | 7 | 57 |
| | Number of shake-out holes | | 1 | 1 | 1 | 1 | 1 | 1 | 1 | 1 | 1 | 1 |
| Evaluation | Shaken-out amount (g) | | 1.5 A | 2.3 A | 3.1 A | 3.7 A | 4.1 A | 5.4 A | 7.3 B | 9.5 B | 0.8 B | 10.7 C |
| | Ease of shaking out | | B | A | A | A | A | A | A | B | C | B |

As shown in Table 4, with the containers used in each example, the shaken-out amount of coating material (breadcrumb mix) as the content material was in an appropriate range, as compared with the containers of the comparative examples. Also, good results were obtained in terms of ease of shaking out. Accordingly, it can be seen that, with the containers used in each example, an appropriate amount of the coating material can be applied collectively and uniformly to the surface of a food material, and a so-called breadcrumb application operation can be easily performed. In Comparative Examples 6 and 7, the maximum diametric length of the shake-out hole was outside the range of 10 to 55 mm, and thus ease of performing the breadcrumb application operation was poor as compared with the containers of the examples.

INDUSTRIAL APPLICABILITY

With the breadcrumbs and the breadcrumb mix according to the present invention, with an easy operation of simply applying the breadcrumbs or the breadcrumb mix directly to a food material (ingredient) such as meat or fish, and deep frying the food material, it is possible to obtain a high-quality cooked breadcrumb-coated food item to which a sufficient amount of crispy coating with appropriate crispiness is uniformly attached, while retaining the flavor of the ingredient to a high level irrespective of the amount of oil used in deep frying.

Also, with the breadcrumb powder shaker container according to the present invention, with an easy operation of simply shaking out the breadcrumb powder to be shaken out that is the content material onto a food material according to a conventional method, an appropriate amount of the breadcrumbs or the breadcrumb mix of the present invention contained in the breadcrumb powder to be shaken out can be applied collectively and uniformly to the surface of the food material. Accordingly, a high-quality cooked breadcrumb-coated food item can be produced efficiently. Also, with the breadcrumbs or breadcrumb mix container according to the present invention, the components of the content material are unlikely to separate from each other during storage, and thus excellent storage stability is obtained.

The invention claimed is:

1. A breadcrumb-coated food item comprising breadcrumbs having a grain size distribution in which the proportion of a fraction of breadcrumbs that have a grain size of 2.36 mm or more is 8 to 21 mass % and the proportion of a fraction of breadcrumbs that have a grain size of 1.18 mm or less is 22 to 45 mass %, and having a bulk density of 270 to 600 ml/100 g,
  wherein the breadcrumbs are formed by drying undried breadcrumbs obtained by crumbling a loaf of bread, and
  wherein the breadcrumbs are directly attached to the surface of a food material.

2. A breadcrumb-coated food item comprising a breadcrumb mix comprising breadcrumbs having a grain size distribution in which the proportion of a fraction of breadcrumbs that have a grain size of 2.36 mm or more is 8 to 21 mass % and the proportion of a fraction of breadcrumbs that have a grain size of 1.18 mm or less is 22 to 45 mass %, and having a bulk density of 270 to 600 ml/100 g,
  wherein the breadcrumbs are formed by drying undried breadcrumbs obtained by crumbling a loaf of bread, and
  wherein the breadcrumb mix is directly attached to the surface of a food material.

3. A method of producing a breadcrumb-coated food item in which breadcrumbs or a breadcrumb mix is directly applied to the surface of a food material, wherein the breadcrumbs or breadcrumb mix have a grain size distribution in which the proportion of a fraction of breadcrumbs that have a grain size of 2.36 mm or more is 8 to 21 mass % and the proportion of a fraction of breadcrumbs that have a grain size of 1.18 mm or less is 22 to 45 mass %, and having a bulk density of 270 to 600 ml/100 g,
  wherein the breadcrumbs are formed by drying undried breadcrumbs obtained by crumbling a loaf of bread.

* * * * *